Oct. 23, 1934.  J. GOGAN  1,978,302
STRENGTH OF MATERIAL TESTING DEVICE
Filed June 1, 1932   3 Sheets-Sheet 1

INVENTOR:
JOSEPH GOGAN
ATTORNEYS

Oct. 23, 1934.   J. GOGAN   1,978,302
STRENGTH OF MATERIAL TESTING DEVICE
Filed June 1, 1932   3 Sheets-Sheet 2

INVENTOR:
JOSEPH GOGAN
ATTORNEYS

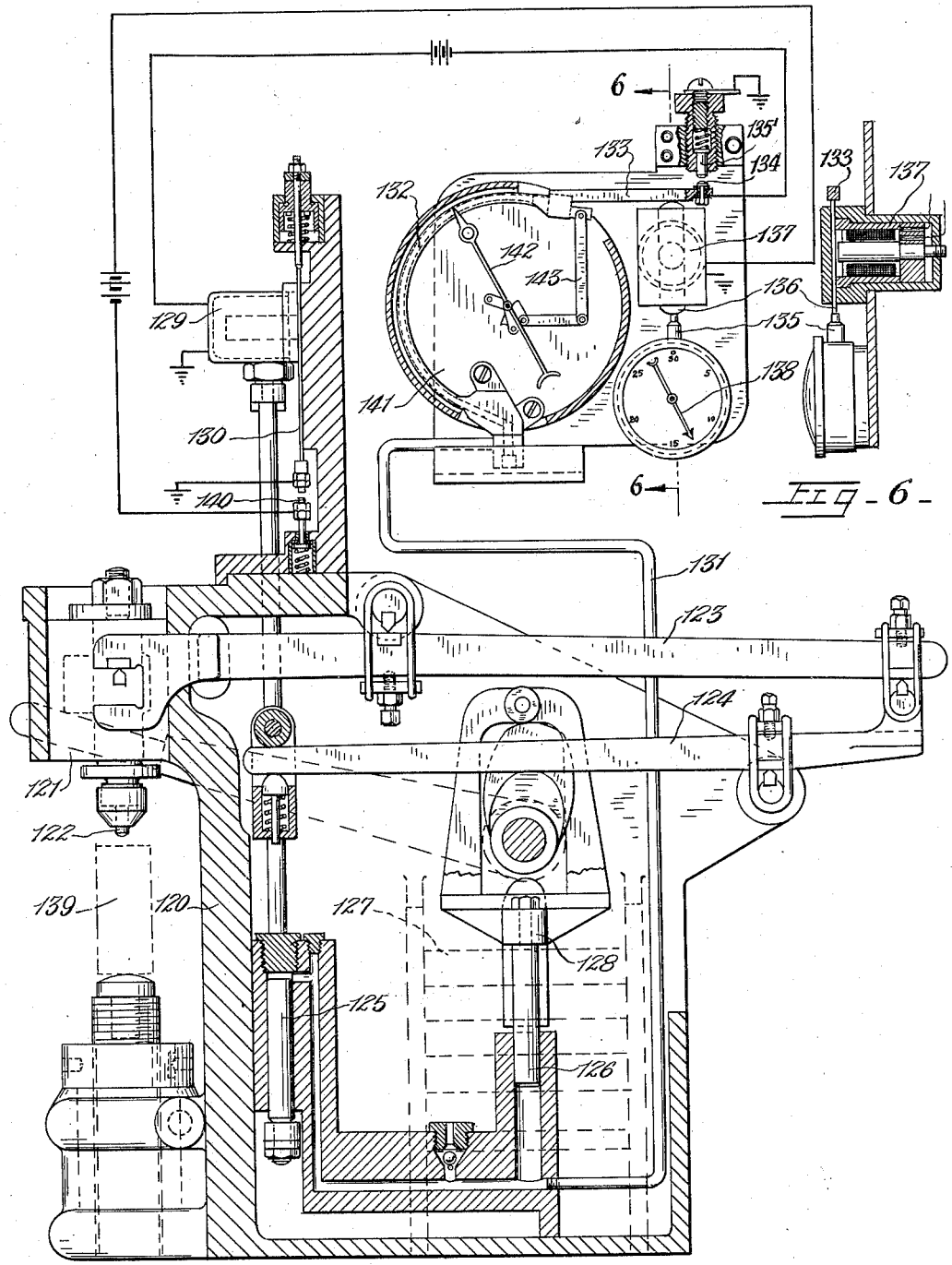

Patented Oct. 23, 1934

1,978,302

UNITED STATES PATENT OFFICE 1,978,302

STRENGTH OF MATERIAL TESTING DEVICE

Joseph Gogan, Lakewood, Ohio

Application June 1, 1932, Serial No. 614,748

14 Claims. (Cl. 265—14)

This invention relates to material testing apparatus, and more particularly to an improved and simplified form of machine for use in rapidly and accurately testing individual bodies for hardness or other desired characteristics.

An object of this invention is to provide a testing machine, of the type referred to, having novel and efficient means for accurately measuring the force required to produce a predetermined distortion in a body being tested.

Another object of this invention is to provide a testing machine which is of simple and compact form, and which embodies novel means for applying a distorting force to a body being tested.

Still another object of my invention is to provide a testing machine, of the type referred to, having a novel form of manually operable means for distorting a body being tested, and also embodying a novel control for the force indicating means.

A further object of my invention is to provide a testing machine, of the type referred to, wherein the force applying means includes a fulcrumed lever and a weight movable by gravity for actuating the lever, and wherein the control for the force indicating means includes an electromagnet which is movable proportionately with the movement of the test member during distortion of the body being tested.

The invention may be further briefly summarized as consisting in certain novel combinations and arrangements of parts, hereinafter described and particularly set out in the appended claims.

In the accompanying sheets of drawings, Fig. 1 is a side view, partly in section, showing an improved testing machine constructed according to my invention;

Fig. 5 is a side view, partly in section, showing another testing machine constructed according to my invention; and Fig. 6 is a sectional view taken on line 6—6 of Fig. 5.

Figure 1:
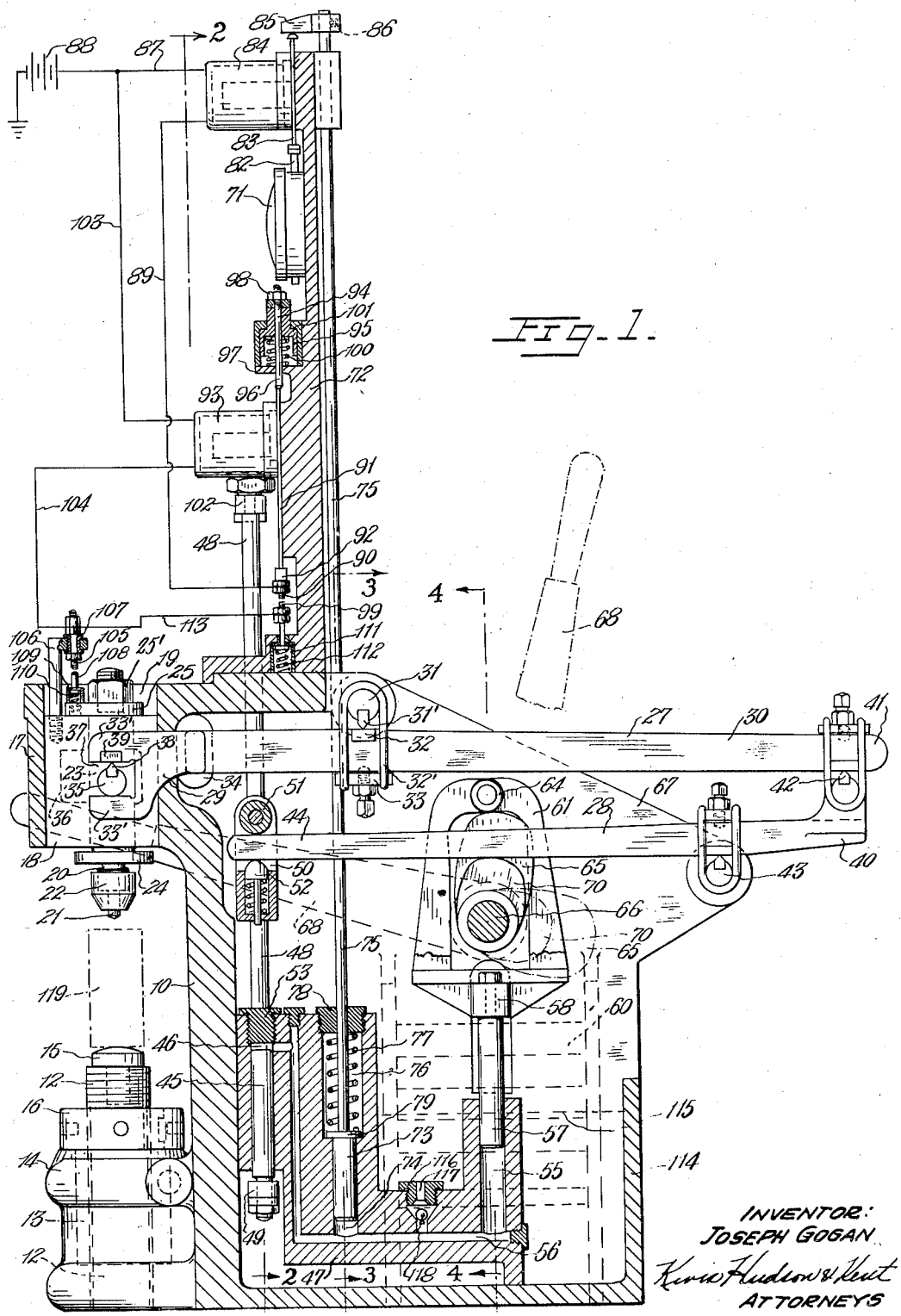

Detailed reference will now be made to the accompanying drawings wherein I have illustrated a novel and improved machine for use in accurately testing individual bodies in rapid succession and without impairment of the utility of the bodies. In the drawings I have illustrated what I now regard to be the preferred forms of my improved testing device, but it should be understood, of course, that my invention may be embodied in various machines or apparatus other than that herein illustrated.

Before proceeding with the detailed description, it is pointed out that, in general, my improved testing apparatus is of the type wherein a body to be tested is distorted by the application of force thereto and a measurement of the force, required to produce a predetermined distortion, is taken as an indication of a particular characteristic of the body. In the following detailed disclosure of my invention, my improved machine is described as a hardness tester wherein the distortion is produced by a compressive force which is applied to the test piece by a contact member or test member in the form of a diamond pointed penetrator or by a Brinell ball. It should be understood, however, that various other suitable forms of test members may be employed and that my improved apparatus is not to be regarded as limited to use as a hardness tester, but may be used for various kinds of test work, for example, it may be used in testing the depth of case hardening, in the testing of springs, as well as for the performance of torsion, tensile or compression tests on various bodies and materials.

As shown in Fig. 1 of the drawings, my improved testing machine is provided with a frame 10 which may be of any suitable form of construction. In this instance, the frame is of the gap type and is provided with a flat base 11 for convenient mounting upon a bench or other suitable support. This frame is also provided with a suitable work support consisting, in this instance, of a screw 12 which extends through a threaded member 13 mounted in the laterally extending projection 14 of the frame, and a mandrel 15 at the upper end of the screw. The mandrel may be adjusted vertically by rotation of the screw relative to the threaded member 13, and may be retained in desired positions of adjustment by means of the lock nut 16.

The frame 10 is also provided with a laterally extending portion or head 17 disposed in spaced overhanging relation with respect to the projection 14. A slide 18, of any desired cross-sectional shape, is slidably mounted in a recess 19 of the projection for movement toward or away from the mandrel 15. The movable slide is provided with a mount 20 for the test member 21, which, in this instance, is in the form of a diamond pointed penetrator, although various other test members, suitable for the kind of test being made, may be employed. The test member is connected to the mount 20 by suitable means, preferably in the form of the chuck or holder 22 provided at the lower end of the mount.

The mount 20 provided for the test member may be of any suitable form of construction and, in this instance, comprises an elongated body or pin 23 extending through the slide 18 in substantially vertical alignment with the axis of the screw 12. For a purpose to be explained hereinafter, the body of the holder is arranged for limited sliding movement relative to the slide 18. The extent of this sliding movement is determined by the spacing of the stops or abutments 24 and 25 which are provided on the body of the holder for cooperation, respectively, with the opposite ends of the slide. As indicated in the drawings, the abutment 24 may be formed integral with the body 23 and the abutment 25 may be a separately formed part clamped against a shoulder on the body by means of the clamping nut 25'.

For actuating the slide and the test member carried thereby, I provide force applying means in the form of the cooperating levers 27 and 28. As shown in Fig. 1 of the drawings, the lever 27 is provided with a head or fork portion 29 for cooperation with the slide, and with a laterally outwardly extending arm portion 30. This lever is pivotally connected to the frame by providing the latter with a suitable fulcrum 31, including a hardened knife edge 31' which engages a hardened bearing block 32 mounted on the lever intermediate its ends. The knife edge may be retained in engagement with the bearing block by means of the retaining strap 32' and the clamping member 33.

The head 29 of the lever 27 is constructed with spaced arm portions 33' which project outwardly through openings 34 provided in the frame and extend on opposite sides of the slide 18. This head may be operatively connected with the slide by providing the latter with a pair of trunnions 35 which extend laterally outwardly through openings 36 of the frame and into recesses 37 of the spaced arm portions 33'. If desired, the trunnions may be provided with hardened knife edge inserts 38 for cooperation with hardened bearing members 39 mounted in the arm portions 33'.

The lever 28 is preferably arranged below the lever 27, and extends in the same general direction with its outer end 40 pivotally connected to the outer end 41 of the lever 27, as by means of the anti-friction connecting device 42. The lever 28 is fulcrumed or pivotally connected to the frame by providing the latter with a suitable fulcrum 43, which may be similar in construction to the fulcrum 31, and which engages the lever at a point intermediate its outer end 40 and its inner end 44. From the arrangement just described, it will be seen that by the application of a force to the lever 28, at a point inwardly of the fulcrum 43, the slide 18 can be moved toward or away from the mandrel 15, depending upon the direction of the movement of the inner end of the lever 28.

As a means of applying such a force to the lever 28 for actuation of the slide, I provide a fluid pressure responsive piston 45 which is operatively connected with the inner end of this lever. This piston is reciprocably mounted in a cylinder 46, which may be formed in the frame 10 but which is preferably formed in a separate body 47 removably secured to the frame, as by means of suitable bolts or studs. The piston is operatively connected with the inner end of the lever by providing a pair of spaced rods 48 having a transverse yoke or bar 49 for engagement with the lower end of the piston, and a transverse yoke or bar 50 for cooperation with the inner end of the lever. The latter yoke may be provided with an anti-friction roller 51 for engagement with one edge of the lever, and with a spring plunger 52 for taking up lost motion and maintaining the lever in engagement with the roller. The cylinder 46 may be closed at its upper end by suitable means, such as a screw plug 53.

Figure 4:
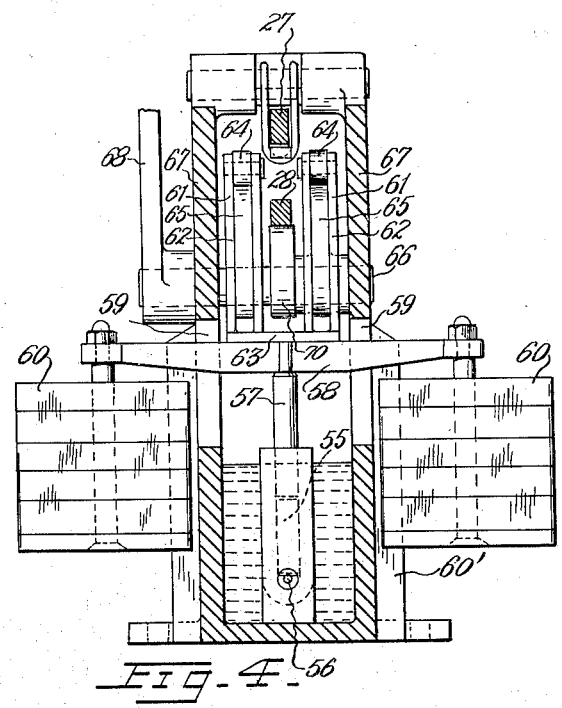
Fig. 4 is another sectional view taken on line 4—4 of Fig. 1.
Figure 3:
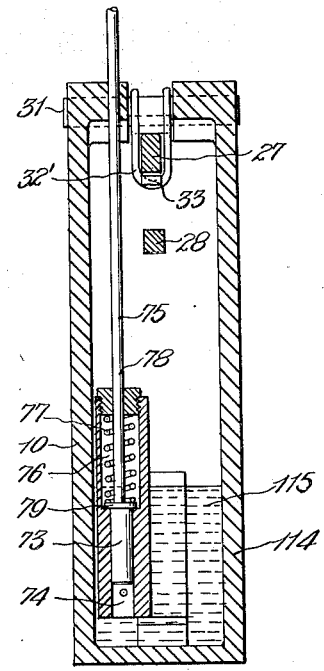
Fig. 3 is a partial sectional view taken on line 3—3 of Fig. 1.

For supplying motive fluid pressure to the cylinder 46, I provide the body 47 with a fluid supply cylinder 55 which communicates with the cylinder 46 through a passage 56. Fluid is discharged from the cylinder 55 by downward movement of a plunger 57 which is reciprocably mounted in this cylinder. For causing such downward movement or power stroke of the plunger, I provide a beam 58 which projects laterally outwardly through a pair of spaced openings 59 provided in the frame, and which is operatively connected to the plunger at the upper end thereof. A pair of weights 60, of suitable mass, are suspended from or otherwise connected to the laterally outwardly extending ends of the beams 58 and are movable by gravity for causing a downward actuation or power stroke of the plunger 57. During movement of the weights, the openings 59 of the frame perform the function of guide slots for guiding the movement of the beam 58. The weights may be composed of several sections, as shown in Fig. 4, which sections may be of any suitable shape but are preferably square or rectangular so as to extend between and cooperate with the spaced guide flanges 60' provided on the frame.

For lifting the weights 60 against the action of gravity, I provide the beam 58 with a pair of laterally spaced yokes 61, each comprising a pair of spaced arms 62 extending upwardly from a connecting block 63 and a roller or cam follower 64 mounted between each pair of arms. For cooperation with the followers 64 I provide a pair of suitably shaped lifting cams 65 which are keyed or otherwise secured to a rock shaft 66 in axially spaced relation thereto. As shown in Fig. 4. this rock shaft is journaled between the pair of upwardly extending spaced frame portions 67 between which the cooperating cams and yokes are disposed. An actuating lever 68, adapted preferably for manual operation, is keyed or otherwise secured to one end of the rock shaft for actuating the latter.

Intermediate the lifting cam 65, I provide another cam 70 which is keyed or otherwise secured to the rock shaft and which engages the lower side of the lever 28 to cause an upward movement of this lever and a corresponding upward movement of the test member 21, when the actuating lever 68 is swung downwardly from its dotted line position to its full line position illustrated in Fig. 1.

For measuring the pressure being applied to the penetrator 21 during a test, I provide a suitable gauge 71 which may be mounted upon a bracket 72 and which is actuated from a fluid pressure responsive plunger 73. This plunger is reciprocable in a cylinder 74 and is connected to an actuating rod 75 which extends upwardly adjacent the bracket 72. The cylinder 74 is preferably formed in the body 47, intermediate the cylinders 46 and 55, and with its lower end in communication with the passage 56. The upper end of the cylinder is enlarged to form a chamber 76 through which the actuating rod 75 extends. A coil spring 77 is disposed in the chamber 76 around the actuating rod and normally moves the plunger downwardly in opposition to the fluid pressure in the cylinder. This spring may be arranged, as shown in Fig. 1, with its upper end in engagement with the screw plug 78, which forms a closure for the chamber 76, and with its lower end in engagement with the collar 79 which functions as a stop for limiting the downward movement of the plunger under the action of the spring.

Figure 2:
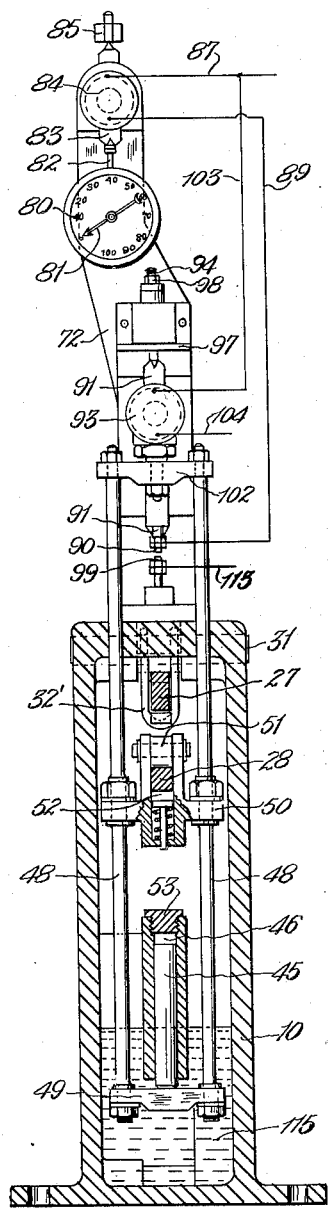
Fig. 2 is a sectional elevation taken substantially on line 2—2 of Fig. 1.

The gauge 71 may be of any suitable construction, but is preferably of the type having a series of characters or indications 80 and a movable pointer 81 which is normally moved in a clockwise direction, as seen in Fig. 2 of the drawings, by a spring contained within the housing of the gauge. A gauge actuating stem 82 projects from the housing of the gauge, in this instance in an upward direction, and is movable inwardly with respect to the housing of the gauge for rotating the pointer in opposition to the gauge spring. A combined control and actuating member 83 is connected to the gauge stem 82 and extends upwardly past the electromagnet 84 for cooperation with the head 85 of the actuating rod 75. The member 83 is preferably of elongated relatively thin form and is constructed of magnetic material so as to be readily attracted by the electromagnet when the latter is energized. The head of the actuating rod may be of any suitable form, and is here shown as a laterally extending member which may be adjusted axially of the actuating rod and clamped in a desired position of adjustment by means of the screw 86. From the arrangement as just described, it will be seen that upward movement of the plunger 73, by the pressure of the motive fluid, will cause the head 85 to be moved upwardly by the actuating rod 75, thereby allowing the pointer of the gauge to be rotated by the gauge spring to indicate the pressure value of the motive fluid.

The electromagnet 84 is mounted upon the bracket 72 in such a manner as to permit vertical sliding movement of the member 83 adjacent the core of the electromagnet. Upon energization of the electromagnet, the member 83 is magnetically attracted and held stationary, thereby locking the gauge pointer and retaining the same in the position corresponding with the existing pressure value of the motive fluid at the time of the energization of the electromagnet. The energizing circuit for this electromagnet includes a conductor 87 which connects one end of the magnet winding with a source of suitable energizing current, such as the storage battery 88, and a conductor 89 which connects the other end of the magnet winding with a movable contact member 90.

The movable electric contact member 90 forms a part of the control means for the force measuring means, which control means will now be described. As shown in Fig. 1, this contact member is mounted upon the lower end of a movable control member 91, but is insulated therefrom by an insulating sleeve or bushing 92. This control member is constructed as a relatively flat elongated body of magnetic material which extends upwardly between the bracket 72 and the core of a movable electromagnet 93. For movably supporting this control member, I provide a plunger 94 which is vertically slidable in a casing 95. This plunger is preferably connected to the upper end of the control member by providing the latter with a stem portion 96 which extends through and is guided in the lateral projection 97 of the bracket 72, and which also extends upwardly through the cooperating casing and the plunger. A nut 98 threaded on the upper end of the stem portion provides an operative connection between the plunger and the control member, and also provides a means for adjusting the initial position of the contact member 90 relative to the stationary contact member 99. A coil spring 100, disposed in the casing 95 and around the stem portion 96, normally acts upon the plunger 94 to move the contact member 90 upwardly away from the contact member 99. The extent of this upward movement under the action of the spring is limited by the shoulder 101 provided on the plunger 94.

The movable electromagnet 93 is carried upon a laterally extending bar or yoke 102 which connects the upper ends of the rods 48, so that when the lever 28 is moved downwardly to transmit a distorting force to the slide 18, the electromagnet 93 will be moved downwardly proportionately with the movement of the penetrator 21. As shown in Fig. 1 of the drawings, the arrangement of this electromagnet and the control member 91 is such that when the electromagnet is energized the control member will be attracted and moved downwardly with the electromagnet through a predetermined distance into engagement with the stationary contact 99.

The energizing circuit for the electromagnet 93 includes a conductor 103 which connects one end of the magnet winding with the conductor 87 and the storage battery 88, and a conductor 104 which connects the other end of the magnet winding with an electric contact member 105. The contact member 105 is adjustably mounted in a bracket 106 which is movable with the slide 18 but is insulated from the bracket by a suitable insulating sleeve or bushing 107. The contact member 105 is disposed above and cooperates with a contact member 108, the latter being mounted upon the abutment 25 of the carrier 20 and thereby grounded. To permit this stationary contact to yield when engaged by the contact 105, I provide a casing 109 in which the contact 108 is slidable, and a spring 110 which is disposed partly in the casing 109 and partly in an opening provided in the abutment 25. When relative movement occurs between the slide 18 and the carrier 20, the contacts 105 and 108 move into engagement with each other to thereby complete the energizing circuit for the electromagnet 93, and, likewise, when the control member 91 is moved downwardly with the electromagnet 93, the contact member 90 engages the contact member 99 to complete the energizing circuit for the electromagnet 84.

To permit the contact 99 to yield when engaged by the movable contact 90, I provide the bracket 72 with an insulated housing 111 in which the contact 99 is slidable. A spring 112, disposed within the insulating housing, normally maintains this contact in its fully extended position, as shown in Fig. 1. The contact 99 being fully insulated from the frame of the machine, I provide a conductor 113 which connects this contact member with the contact member 105, so that the circuit for the electromagnet 84 may be completed through the contact 108 and the frame of the machine.

It is desirable that the cylinders 46, 55 and 74 be maintained fully charged with a suitable motive fluid, such as a light oil, and to this end I construct the frame of the machine with an integral reservoir 114 in which the body 47 is mounted. A quantity of fluid 115 is maintained in the reservoir 114 at a level above the elevation of the check valve 116 provided in the body 47. This check valve may be of any suitable construction, and is here shown as a ball-type check valve, having a passage 117 which establishes communication between the cylinders and the reservoir when the plunger 57 is in its elevated position, and which is closed by the movable check ball 118 when the plunger begins its downward power stroke.

During the operation of my testing machine, the actuating lever or handle 68 is swung by the operator to the full line position illustrated in Fig. 1, thereby rotating the cams 65 and 70 about the axis of the rock shaft 66. Rotation of the cams 65 lifts the weights 60 and the plunger 57, and at the same time rotation of the cam 70 swings the lever 28 upwardly about the fulcrum 43. The upward movement of this lever causes the outer end of the lever 27 to be swung downwardly about the fulcrum 31, thereby moving the slide 18, and the penetrator 21 carried thereby, upwardly to the open position. A body to be tested, such as the body 119, is now placed upon the mandrel 15, after which the operator swings the lever 68 upwardly to the dotted line position shown in Fig. 1. This upward movement of the lever again rotates the cams 65 about the axis of the shaft 66, but in an opposite direction, thereby allowing the weights 60 to be moved downwardly by gravity, which causes a downward power stroke of the plunger 57 in its cylinder 55. The power stroke of the plunger delivers fluid to the cylinders 46 and 74 to actuate the plungers 45 and 73 of these cylinders. The downward actuation of the plunger 45, by the pressure of the motive fluid, causes the inner end 44 of the lever 28 to be moved downward thereby transmitting force through the lever 27 to cause the slide 18 to move the penetrator 21 downwardly into engagement with the test piece 119. Engagement of the penetrator with the test piece resists further movement of the carrier 20 causing movement of the latter to be arrested, but permitting continued downward movement of the slide. This continued movement of the slide, after movement of the carrier has been stopped, brings the contacts 105 and 108 into engagement with each other, thereby completing the circuit for the movable electromagnet 93. Energization of this magnet causes the control member 91 to be attracted and thereby connected for downward movement with the inner end of the lever 28.

The pressure of the motive fluid in the cylinder 74 moves the plunger 73 upwardly against the action of the spring 77 thereby causing an upward movement of the actuating rod 75 and the head 85 carried thereby. This upward movement of the head 85 permits the gauge stem 82 and the gauge actuating member 83 to be moved upwardly past the electromagnet 84 by the gauge spring which also causes rotation of the gauge pointer 81. It should be stated at this point that the spring 77 and the cross-sectional area of the plunger 73 are so proportioned, that the movement imparted to the rod 75 by the pressure of the motive fluid will permit proper movement of the gauge pointer 81 to continuously indicate the pressure value of the motive fluid.

Since the electromagnet 93 is energized substantially immediately upon engagement of the penetrator 21 with the test piece 119, and is connected with the lever 28 of the force applying means, it will be seen that the control member 91 and the contact 90 carried thereby will be moved downwardly simultaneously with, and proportionately with, the movement of the penetrator during distortion of the test piece. The downward movement of the contact 90 through the desired predetermined distance, which is determined by the initial spacing of this contact relative to the contact 99, closes the energizing circuit for the stationary electromagnet 84. When thus energized, the electromagnet 84 attracts and holds the actuating member 83 and thereby locks the gauge pointer 81 against further movement.

At this point in the operation of the machine, the operator notes the position of the gauge pointer, which is an indication of the value of the force or pressure required to be applied to the penetrator 21 to cause a predetermined distortion of the test piece. If the reading of the gauge is too low, as compared with a previously established reference mark, the operator will know that the penetrator was forced into the test piece the predetermined distance with less pressure than should have been required and that the piece being tested is too soft. If the reading of the gauge shows a pressure value higher than that indicated by the reference mark, the operator will know that the piece is harder than required. Knowing the permissible variation in the characteristic being tested, the operator passes or rejects the individual pieces as they are tested.

In carrying out a test of this kind, it is desirable that the penetrator be moved into the test piece with a slow, but uniform movement, and it will be seen that in my testing machine this desired feature of operation is attained by the action of the cams 65 in preventing too rapid downward movement of the weights 60. In other words, as the operator swings the lever 68 toward its dotted position with a uniform movement, the cams 65 permit a uniform downward movement of the weights 60, thereby transmitting actuating force to the slide 18 in a manner to cause downward movement of the penetrator 21 at a uniform rate during distortion of the test piece.

In Figs. 5 and 6 of the drawings, I have shown a testing machine which is generally similar in construction and operation to the testing machine already described, but wherein the force measuring means includes a novel control arrangement. As shown in Figs. 5 and 6, this machine is provided with a frame 120 and with a slide 121 which is movably mounted in the frame and which carries a suitable test member or penetrator 122. The slide is actuated by levers 123 and 124 which are fulcrumed on the frame of the machine. Actuating force is applied to the inner end of the lever 124 by a plunger 125 which is actuated by pressure fluid supplied by downward movement of a plunger 126. The plunger 126 is moved downwardly by the weights 127 acting through the transversely extending beam 128.

A movable electromagnet 129 is connected to the inner end of the lever 124 so that movement of the electromagnet is proportionate with the movement of the test member 122. When energized, this electromagnet connects a movable control member 130 with the lever 124, thus causing this control member to be moved proportionately with the movement of the test member. In this form of my testing machine, the pressure of the motive fluid supplied by the plunger 126 is transmitted through a conduit 131 to a Bourdon tube 132 which constitutes a part of the control for the force measuring means. The movable end of the Bourdon tube carries an extension 133 which functions as a movable control member. This extension carries a suitably insulated movable electric contact member 134, and also serves as a means for limiting the upward movement of the gauge stem 135 and of the magnetizable gauge actuating member 136, under the action of the gauge spring. As the pressure transmitted to the Bourdon tube increases, the tendency for this tube to straighten out causes an upward movement of the control member 133, bringing the contact 134 into engagement with the stationary contact member 135', to thereby complete the energizing circuit for the movable electromagnet 129. This upward movement of the control member 133 also permits the gauge actuating member 136 to be moved upwardly past the stationary electromagnet 137, which in turn permits the gauge stem 135 to be moved upwardly by the gauge spring and the gauge pointer 138 to be rotated correspondingly to indicate the pressure value of the motive fluid.

As the test member 122 is pressed into the test piece 139, the electromagnet 129 moves downwardly with the lever 124 and at the same time moves the control member 130 downwardly proportionately with the test member and through a predetermined distance into engagement with a suitably insulated stationary contact member 140. Engagement of the control member with the contact 140 closes the circuit of the electromagnet 137, resulting in the gauge actuating member 136 being attracted and held, and thereby locking the gauge pointer against further movement. The operator then notes the position of the gauge pointer 138 which furnishes him an indication of the pressure required to move the test member a predetermined distance into the test piece, which pressure reading may be regarded as a direct indication of the hardness of the body being tested.

If desired, the Bourdon tube 132 may be a part of a pressure gauge 141 of conventional construction, having a pointer 142 which is operatively connected with the Bourdon tube by means of the linkage 143. The indications furnished by the pointer 142 may be disregarded by the operator in making tests, or may be referred to from time to time and compared with the indications furnished by the gauge pointer 138 as a means of checking the accuracy of the machine.

As stated above my improved apparatus may be used for various kinds of test work, such as the testing of springs, as well as for the performance of torsion, tensile or compression tests of bodies and materials. In all of the tests just mentioned force is applied to the test piece to cause a predetermined amount of distortion and the value of the force necessary to produce the predetermined distortion is compared to the force known to be required to produce such distortion in a test piece possessing the desired characteristic.

When the test is a compression test, and likewise when the piece to be tested is a spring, the piece is held on a suitable support and force is applied to deflect the piece a predetermined amount, the force applied and such predetermined deflection being gauged in substantially the same manner and by substantially the same means as disclosed for making the hardness test.

When the test is a torsion test, the piece, such as a sample of shafting may have one end thereof held against turning in a suitable clamp or chuck and the distorting force may be applied to the end of a radial lever arm which is connected to the other end of the sample. If the test is for tensile strength, the piece is held at one end in a suitable clamp or chuck and the force is applied to the piece, as through suitable force transmitting means including a clamp applied to the piece, to act thereon in a direction away from the first clamp so as to "stretch out" the piece. In other respects the torsion and tensile tests are substantially the same as a hardness test.

It should now be understood, from the accompanying drawings and the foregoing description, that I have provided a novel and improved testing apparatus which is of very simple and compact construction and very efficient in operation. It will also be seen that my improved testing apparatus can be manually operated by unskilled persons for performing reliable tests upon individual bodies in rapid succession. The novel arrangement of the force applying means contributes to the efficiency of operation and simplicity of construction of the machine, and the novel arrangement of force measuring means renders the machine very accurate and reliable in operation.

While I have illustrated and described the apparatus of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. In a testing machine of the character described the combination of a frame having a test piece support and a contact member movable relative to said support, means for applying a force to said contact member to thereby distort a test piece, indicating means responsive to said force, control means for said indicating means including a control element movable through a predetermined distance, and means including an electromagnet for releasably connecting said control element for movement simultaneously with and proportionately to movement of the contact member during distortion of the test piece.

2. In a testing machine of the character described the combination of a frame having a test piece support and a contact member movable relative to said support, means for applying a force to said contact member to thereby distort a test piece, indicating means responsive to said force, control means for said indicating means including a control element movable through a predetermined distance, an electromagnet for actuating said control element, connections for moving said electromagnet proportionately with movement of said contact member during distortion of said test piece, and means timed with said contact member for energizing said electromagnet.

3. In a testing machine of the character described the combination of a frame having a test piece support and a contact member movable relative to said support, means for applying a force to said contact member to thereby distort a test piece, indicating means responsive to said force, control means for said indicating means including a control element movable through a predetermined distance, an electromagnet for actuating said control element, means operably connecting said electromagnet with said force applying means for movement simultaneously with and proportionately to the movement of said contact member, and means timed with said contact member for energizing said electromagnet.

4. In a testing machine of the character described the combination of a frame having a test piece support and a test member movable relative to said support, force applying means for initially moving said test member into engagement with a test piece and for subsequently causing distortion of the test piece, means for measuring the force applied to said test member during distortion of the test piece, a movable control, means responsive to a predetermined movement of said control for discontinuing the action of said measuring means, and means for moving said control proportionately with movement of said test member during distortion of the test piece comprising an electromagnet, a circuit for said electromagnet, and means effective substantially upon engagement of said test member with said test piece for closing said circuit.

5. In a testing machine of the character described the combination of a frame having a test piece support and a test member movable relative to said support, force applying means for initially moving said test member into engagement with a test piece and for subsequently causing distortion of the test piece, means for measuring the force applied to said test member during distortion of the test piece, a movable control, means responsive to a predetermined movement of said control for discontinuing the action of said measuring means, and means for moving said control comprising a movable electromagnet, a circuit for said electromagnet, means effective substantially upon engagement of said test member with said test piece for closing said circuit, and means actuated by said force applying means for moving said electromagnet proportionately with movement of said test member during distortion of said test piece.

6. In a testing machine of the character described the combination of a frame having a test piece support and a slide movable toward and away from said support, a contact member carried by said slide and having limited movement relative thereto, force applying means for moving said contact member into engagement with a test piece and for subsequently causing distortion of the test piece, means for measuring the force applied to said contact member during the distortion of the test piece, a movable control, means responsive to a predetermined movement of said control for discontinuing the action of said measuring means, and means for moving said control proportionately with movement of said contact member during distortion of said test piece, the last mentioned means comprising an electromagnet adapted to be moved by said force applying means, a circuit for said electromagnet, and cooperating electric contact elements associated respectively with said slide and said contact member for closing said circuit substantially upon engagement of said contact member with said test piece.

7. In a testing machine of the character described the combination of a frame having a test piece support and a slide movable relative to said support, a test member movable with said slide into engagement with a test piece, means for applying force to said test member to distort said test piece, said means comprising a lever fulcrumed on said frame and having operative connection at one end with said slide, a second lever fulcrumed on said frame with one end operatively connected with the other end of the first mentioned lever, an actuating piston operatively connected with the other end of said second lever, a cylinder for said piston, a fluid supply cylinder communicating with the first mentioned cylinder, a plunger in said supply cylinder, and a weight movable by gravity for actuating said plunger.

8. In a testing machine of the character described the combination of a frame having a test piece support and a slide movable relative to said support, a test member movable with said slide into engagement with a test piece, means for applying force to said test member to distort said test piece, said means comprising a lever fulcrumed on said frame and having operative connection with said slide, an actuating piston for said lever, a cylinder for said piston, means for supplying motive fluid to said cylinder, indicating means responsive to the force applied during distortion of the test piece, a control for said indicating means including a member movable through a predetermined distance, and means for moving said control proportionately with movement of said test member during distortion of said test piece.

9. In a testing machine of the character described the combination of a frame having a test piece support and a slide movable relative to said support, a contact member movable with said slide into engagement with a test piece, means for applying a force to said contact member to distort said test piece comprising a lever fulcrumed on said frame and having one end operatively connected with said slide, a second lever fulcrumed on said frame and having one end operatively connected with the other end of the first mentioned lever, a piston operatively connected with the other end of said second lever, a cylinder for said piston, a motive fluid supply cylinder communicating with the first mentioned cylinder, a plunger in said supply cylinder, and a weight movable by gravity for actuating said plunger, indicating means responsive to the pressure of the motive fluid, a control for said indicating means including a member movable through a predetermined distance, and a movable electromagnet actuated by one of said levers for moving the last mentioned member proportionately with movement of said contact member during distortion of said test piece.

10. In a testing machine of the character described the combination of a frame having a test piece support and a slide movable relative to said support, a contact member movable with said slide into engagement with a test piece, means for applying a force to said contact member to distort said test piece comprising a lever fulcrumed on said frame and having one end operatively connected with said slide, a second lever fulcrumed on said frame and having one end operatively connected with the other end of the first mentioned lever, a piston operatively connected with the other end of said second lever, a cylinder for said piston, a motive fluid supply cylinder communicating with the first mentioned cylinder, a plunger in said supply cylinder, a weight movable by gravity for actuating said plunger, means including a manually operable member for moving said weight in opposition to gravity, indicating means responsive to the pressure of the motive fluid, a control for said indicating means including a member movable through a predetermined distance, and a movable electromagnet actuated by one of said levers for moving the last mentioned member proportionately with movement of said contact member during distortion of said test piece.

11. In a testing machine of the character described the combination of a frame having a test piece support and a slide movable relative to said support, a contact member movable with said slide into engagement with a test piece, means for applying a force to said contact member to distort said test piece comprising a lever fulcrumed on said frame and having one end operatively connected with said slide, a second lever fulcrumed on said frame and having one end operatively connected with the other end of the first mentioned lever, a piston operatively connected with the other end of said second lever, a cylinder for said piston, a motive fluid supply cylinder communicating with the first mentioned cylinder, a plunger in said supply cylinder, a weight movable by gravity for actuating said plunger, indicating means responsive to the pressure of the motive fluid, a control for said indicating means including a member movable through a predetermined distance, a movable electromagnet actuated by one of said levers for moving the last mentioned member proportionately with movement of said contact member during distortion of said test piece, a circuit for said electromagnet, and means effective substantially upon engagement of said contact member with said test piece for closing said circuit.

12. In a testing machine of the character described the combination of a frame having a test piece support and a slide movable relative to said support, a test member movable with said slide for engagement with a test piece, a movable weight, means actuated by gravitational movement of said weight to cause distortion of said test piece by said test member, manually operable means including a member shiftable in one direction for lifting said weight and moving said test member away from said support and shiftable in another direction for controlling the rate of gravitational movement of said weight, indicating means responsive to the force applied to said test member, and a control for said indicating means, said control being responsive to movement of said test member through a predetermined distance during distortion of said test piece.

13. In a testing machine of the character described the combination of a frame having a test piece support and a slide movable relative to said support, a test member movable with said slide for engagement with a test piece, a movable weight, means actuated by gravitational movement of said weight to cause distortion of said test piece by said test member, manually operable means including a member shiftable in one direction for lifting said weight and moving said test member away from said support and shiftable in another direction for controlling the rate of gravitational movement of said weight, means for measuring the force applied to said test member, an electromagnet for locking said measuring means, means for energizing said electromagnet including a magnetizable control member movable through a predetermined distance, means for moving said control member proportionately with movement of said test member during distortion of said test piece including a movable electromagnet having actuating connection with said manually operable means, and means effective substantially upon engagement of said test member with said test piece for controlling the energization of said movable electromagnet.

14. In a testing machine of the character described, the combination of a test piece support, a test member movable relative to said support, force applying means for moving said test member into engagement with a test piece and for subsequently causing distortion of the test piece including a piston and a cylinder for said piston, means for supplying motive fluid to said cylinder, means including a Bourdon tube for measuring the pressure of said motive fluid, a member movable through a predetermined distance for controlling the measuring means, an electromagnet for moving the last mentioned means proportionately with movement of said test member during distortion of said test piece, a circuit for said electromagnet, and means actuated by movement of said Bourdon tube for closing said circuit.

JOSEPH GOGAN.